United States Patent
Matranga et al.

(10) Patent No.: US 9,383,483 B2
(45) Date of Patent: Jul. 5, 2016

(54) DIFFUSE CHOLESTERIC REFLECTOR

(75) Inventors: Mario Ariosto Matranga, Bristol (GB); Jana Heuer, Cottius (DE); Stephen Kitson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 82 days.

(21) Appl. No.: 14/346,781

(22) PCT Filed: Oct. 31, 2011

(86) PCT No.: PCT/US2011/058680
§ 371 (c)(1),
(2), (4) Date: Mar. 24, 2014

(87) PCT Pub. No.: WO2013/066308
PCT Pub. Date: May 10, 2013

(65) Prior Publication Data
US 2014/0226209 A1    Aug. 14, 2014

(51) Int. Cl.
*G02B 5/02* (2006.01)
*G02B 5/22* (2006.01)

(52) U.S. Cl.
CPC ............... *G02B 5/02* (2013.01); *G02B 5/0242* (2013.01); *G02B 5/0284* (2013.01); *G02B 5/223* (2013.01)

(58) Field of Classification Search
CPC ...... G02B 5/02; G02B 5/0205; G02B 5/0236; G02B 5/0242; G02B 5/0263; G02B 5/0284; G02B 5/223; G02B 5/26; C09K 19/02; G02F 2201/34–2201/343
See application file for complete search history.

(56) References Cited

U.S. PATENT DOCUMENTS

| | | | |
|---|---|---|---|
| 6,377,325 B2 * | 4/2002 | Faris et al. | 349/98 |
| 6,724,459 B2 | 4/2004 | Yoon | |
| 6,950,157 B2 | 9/2005 | Stephenson et al. | |
| 7,030,949 B2 | 4/2006 | Kashima | |
| 7,160,586 B2 | 1/2007 | Radcliffe et al. | |
| 7,686,977 B2 | 3/2010 | Hiji et al. | |
| 2003/0063245 A1 * | 4/2003 | Bowley et al. | 349/115 |
| 2005/0266158 A1 | 12/2005 | Pokorny et al. | |
| 2006/0139531 A1 | 6/2006 | Kashima | |

FOREIGN PATENT DOCUMENTS

| | | |
|---|---|---|
| JP | 2002116322 A | 4/2002 |
| WO | WO-2011075149 A1 | 6/2011 |

OTHER PUBLICATIONS

Hijnen et al., "Self-Organization of Particles with Planar Surface Anchoring in a Cholesteric Liquid Crystal," Langmuir, vol. 26(16), Jul. 21, 2010, pp. 13502-13510.*
International Preliminary Report on Patentability, May 15, 2014, The International Bureau of WIPO, PCT Patent Application No. PCT/US2011/058680.

(Continued)

*Primary Examiner* — Stephone B Allen
*Assistant Examiner* — Adam W Booher
(74) *Attorney, Agent, or Firm* — Patent Law Offices of David Millers

(57) ABSTRACT

A diffuse reflector (100) uses a host layer (120) containing particles (122). The host layer (120) contains a cholesteric material that reflects a first frequency of light, and the particles (122) in the host layer (120) create separate cholesteric domains (126) that reflect light of the first frequency in different directions.

16 Claims, 4 Drawing Sheets

(56) References Cited

OTHER PUBLICATIONS

English translation (machine-generated) of Abstract from Japanese Patent Publication No. 2002-116322A [retrieved on Mar. 13, 2014], Retrieved from the Internet: <http://worldwide.espacenet.com/publicationDetails/biblio?DB=worldwide.espacenet.com&II=1&ND=3&adjacent=true&locale=en EP&FT=D&date=20020419&CC=JP&NR=2002116322A&KC=A>.

International Search Report and Written Opinion, May 4, 2012, PCT Patent Application No. PCT/US2011/058680.

Zapotocky et al., Particle Stabilized Defect Gel in Cholesteric Liquid Crystals Science, vol. 283, Jan. 8, 1999, pp. 209-212.

* cited by examiner

DIFFUSE CHOLESTERIC REFLECTOR

CROSS-REFERENCE TO RELATED APPLICATION

This application is a U.S. National Stage Application of and claims priority to International Patent Application No. PCT/US2011/058680, filed on Oct. 31, 2011, and entitled "DIFFUSE CHOLESTERIC REFLECTOR".

BACKGROUND

Optically diffuse structures often include a substrate such as polymer film or glass plate with a textured surface. These diffuse structures can be made reflective by coating a textured surface with an appropriate layer. Coating a diffuse substrate with a metal such as silver or aluminum, for example, will give a white diffuse reflector. Diffuse reflectors could be made colored by coating with an additional color filter layer that absorbs some of the visible spectrum. However, many applications, such as reflective displays, require that the wavelengths that are not reflected are instead transmitted. The use of a metal reflector layer prevents this.

An alternative reflective coating for a diffuse reflector is a multilayer dielectric mirror, which could be used in place of the metal coating and color filter. Dielectric mirrors are conventionally formed from alternating layers of materials with different refractive indices. In a standard design, the layer thicknesses are set to be a quarter of the wavelength of the desired peak reflection wavelength. Metal oxides are often used to achieve the required refractive indices, but for the most part, depositing metal oxides requires vacuum processes such as sputter coating. Each layer may need to be deposited separately and with high accuracy for the thicknesses and properties of the layer, and a typical dielectric mirror design requires at least 10 layers, often many more. The fabrication of a dielectric mirror can therefore be slow, expensive, and difficult to implement over large areas because of the need for processing in a vacuum. The resulting structures may also be brittle and thus are not ideally suited for applications that require robust or flexible parts.

Another alternative for a color mirror uses cholesteric polymers. Cholesteric polymers tend to self-organize into chiral periodic structure, and the period of the chiral structure can be matched to the optical wavelength to be reflected. A mirror fabricated using cholesteric polymers has the advantages that the polymers can be solution coated under atmospheric conditions, which may reduce fabrication costs, and the polymers generally form robust flexible films. However, it can be a challenge to make mirror structures involving cholesteric polymers diffuse. Cholesteric films are self-ordering. If the cholesteric polymer is simply coated onto a textured surface, the self-ordering might smooth out distortions create by the texture. As a result, mirror structures involving cholesteric polymer layers may not be as diffuse as required in some applications.

BRIEF DESCRIPTION OF THE DRAWINGS

Use of the same reference symbols in different figures may indicate similar or identical items.

DETAILED DESCRIPTION

A diffuse reflector that can diffusely reflect one or more wavelengths of light but transmit other wavelengths includes a layer containing cholesteric reactive mesogens and discrete particles. In general, mesogens are materials such as liquid crystalline materials that have different phases between the common solid, liquid, and gas phases. Reactive mesogens are mesogens having a chemical structure that includes one or more polymerizable groups, typically acrylates, allowing the reactive mesogens to be polymerized. Cholesteric reactive mesogens exhibit a helical structure due to the presence of chiral moieties in the material, and the polymerization of cholesteric reactive mesogens generally preserves the anisotropic structure of the corresponding liquid crystal phase. The discrete particles in the layer can disrupt the self-ordering of cholesteric reactive mesogens, creating defects and separate cholesteric domains that reflect light in different directions. As a result, a polymerized layer of cholesteric reactive mesogens and discrete particles can produce diffuse reflection even when formed on a smooth substrate. In one arrangement, the particles are smaller than the wavelength of the light of interest, so that the particles themselves have little or no direct effect on the reflected or transmitted light. In another arrangement, the particles have a direct optical effect on light that the diffuse reflector reflects or transmits.

Figure 1A:
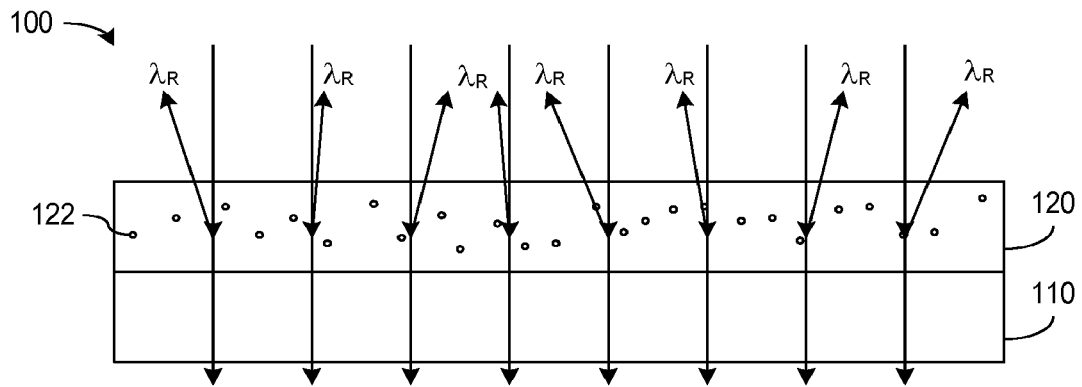
FIG. 1A shows a cross-sectional view of an example of a diffuse mirror using cholesteric material containing particles smaller than a wavelength of light reflected by the cholesteric material.

FIG. 1A shows one example of a diffuse reflector 100 including a polymerized layer 120 of cholesteric reactive mesogens on a substrate 110. The cholesteric reactive mesogens in layer 120 have a helical pitch and reflect light that has both a circular polarization corresponding to a handedness of the cholesteric mesogens and a wavelength in a band centered on a specific wavelength $\lambda_R$. To produce diffuse reflection, discrete particles 122 are introduced into layer 120. Particles 122 can cause defects in the structure created by polymerization of the cholesteric reactive mesogens. For example, particles 122 may have surfaces that are treated so that the reactive mesogens tend to align parallel or perpendicular to the surfaces of particles 122, and the forced alignment at the surfaces of particles 122 disrupts the self-ordering of the cholesteric reactive mesogens. The resulting polymer/particle composite diffusely reflects light within a wavelength band centered on wavelength $\lambda_R$.

FIG. 1A also illustrates white light (or polychromatic light) at normal incidence on diffuse reflector 100. A fraction of the incident light having wavelengths in a band centered on a wavelength $\lambda_R$ that is associated with the helical pitch of the cholesteric reactive mesogens is reflected in layer 120. However, the reflection is diffuse as a result of the randomness in the orientations of cholesteric domains created by the presence of particles 122 in layer 120. The light not reflected in layer 120 is primarily transmitted through diffuse reflector 100.

Figure 1B:
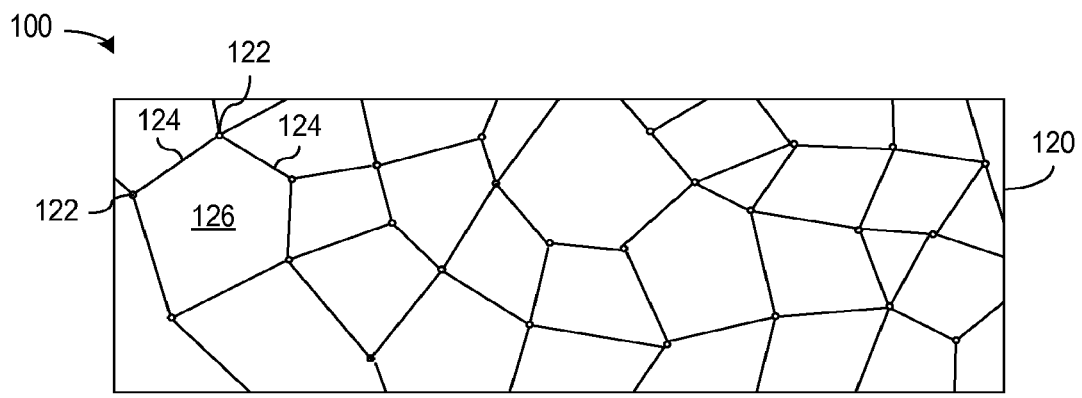
FIGS. 1B and 1C show plan views of examples of diffuse mirrors using the same concentration of particles in cholesteric material having different helical pitches.

FIG. 1B shows a plan view of layer 120 magnified sufficiently to illustrate the characteristics of layer 120 for reflected light. In particular, particles 122 create disclinations 124 that separate cholesteric domains 126 in the bulk of cholesteric layer 120. Reactive mesogens in each cholesteric domain 126 are self-ordered so that the helical axes of the reactive mesogens are aligned within the cholesteric domain 126, but the alignment direction varies from one cholesteric domain 126 to the next. Alignment processes can be used to improve the uniformity of alignment of the cholesteric reactive mesogens within each cholesteric domain 126. One way to improve alignment is to treat or form substrate 110 to define an overall planar alignment direction. For some applications, substrate 110 may be a supporting plastic substrate that is rubbed or buffed to define a planar alignment. Alternatively, substrate 110 can include a polyimide layer that is rubbed or buffed. Adding a thin layer of a reactive mesogen material that does not contain particles on the rubbed (polyimide or substrate) surface can further improve alignment of the cholesteric reactive mesogens. The reactive mesogens in the added layer may not be chiral, so that the added layer may be a planar aligned layer that acts to smooth out any scratches or defects in the rubbed surface. The cholesteric reactive mesogens in layer 120 may thus be more uniformly aligned in each cholesteric domain 126, even though disclinations 124 in layer 120 perturb the alignment direction randomly from one cholesteric domain 126 to the next.

Helical structures in each domain 126 cause reflection by constructive interference of light of wavelength $\lambda_R$ in a specific direction relative to the axis of the helical structure, and each cholesteric domain 126 may have a different characteristic axis for their respective helical structures. Each cholesteric domain generally reflects a range of wavelengths, which may be referred to as the reflective band. The central wavelength $\lambda_R$ of the reflective band for reflector 100 is given by, $\lambda_R = nP \cos \theta$, where n is the average refractive index of the cholesteric material, $\lambda_R$ is the wavelength of the incident light, P is the helical pitch of the cholesteric material, and $\theta$ is the angle of the incident light relative to the helical axis in a cholesteric domain. The width of the reflective band primarily depends on the birefringence of the cholesteric material, i.e., depends on the difference of the refractive index $n_e$ for light having a linear polarization parallel to the optical axis of the material and the refractive index $n_o$ of light having a linear polarization perpendicular to the optical axis of the material. The width of the reflective band may further depend on variation in the alignment of the cholesteric domains and amount of angular diffusion of the incident light.

Figure 1C:
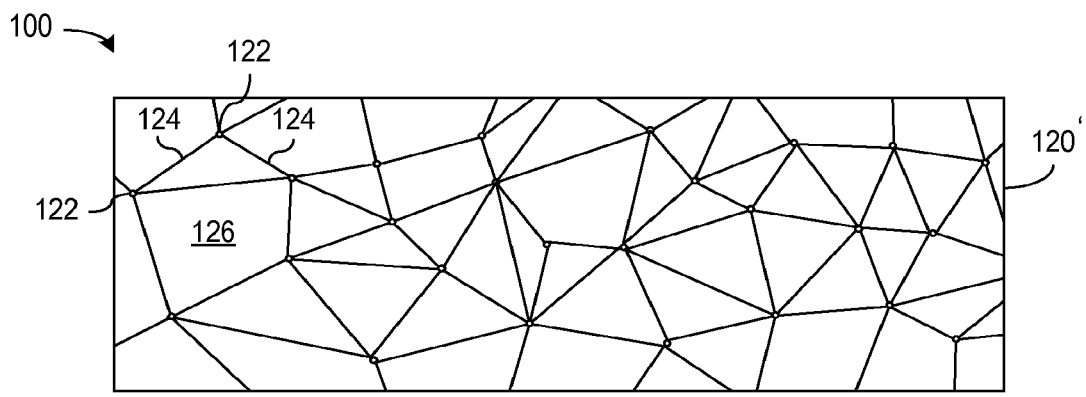

FIG. 1B illustrates disclinations 124 for one concentration of particles 122 in a cholesteric material having a given helical pitch. Increasing the concentration of particles 122 in the mixture forming layer 120 generally increases the density of disclinations 124, decreases the size of the cholesteric domains 126, and increases the amount of scattering of reflected light. The density of disclinations 124 and the size of cholesteric domains 126 may also depend on the helical pitch of the cholesteric material. FIG. 1C, for example, illustrates an example of disclinations 124 that may result in a layer 120 of cholesteric reactive mesogens containing the same density of particles 122 as in the example of FIG. 1B but using a cholesteric material having a shorter helical pitch. In particular, the density of disclinations 124 in FIG. 1C is higher in cholesteric material have a shorter helical pitch. The shorter helical pitch of layer 120' of FIG. 1C would also cause diffuse reflector 100 to reflect a shorter wavelength of light than would layer 120 of FIG. 1B.

The characteristics of diffuse reflector 100 are subject to wide variations that permit tailoring of diffuse reflector 100 for many purposes. In particular, the wavelength of light reflected in layer 120 can be selected through selection of a helical pitch of the cholesteric reactive mesogens that are polymerized to form layer 120. A nematic liquid crystal may become cholesteric through addition of a chiral additive, and the helical pitch of the resulting mixture depends on characteristics and the relative concentrations of the liquid crystal and the chiral additive. As a result, the wavelengths reflected by layer 120 can be controlled through selection of the type and concentration of chiral additive.

The amount of scattering of reflected light is also selectable through selection of the size, type, and concentration of particles 122. In general, higher concentrations of particles 122 are more disruptive of the cholesteric structure and cause more scattering of reflected light. In some configuration of diffuse reflector 100, particles 122 are nanoparticles that form 1% to 2% by weight of layer 120, but concentrations of particles 122 can be less than 1% by weight. In general, the concentration of particles 122 may vary from about 0.1% by weight to about 5% by weight depending on the cholesteric reactive mesogens and the characteristics such as the size and density of particles 122. The concentrations of particles 122 may also depend on the pitch of the cholesteric reactive mesogens and on the desired angular diffusion of diffuse reflector 100. For example, a cholesteric structure that reflects red light and contains a concentration of 1.1% of particles of dimension about 230 nm may provide a scattering angle in a range of about 2° to 4°.

Substrate 110 can be selected according to the desired characteristics of the transmitted light. In FIG. 1, substrate 110 has planar surfaces, and a layer (not shown) on top of layer 120 and providing the same refractive index as the substrate 110 could be added to diffuse mirror 100 to provide transmission with little or no scattering. However, either surface of substrate 110 could be textured if scattering of transmitted light is desired. Substrate 110 can also be transparent to transmit all of the light that is not reflected in layer 120 or be colored, e.g., contain a dye or pigment or have a filter layer to transmitted, absorb, or reflect specific wavelengths of light. Substrate 110 could further have a variety of coatings such as an antireflective coating at the interface with layer 120.

Figure 2:
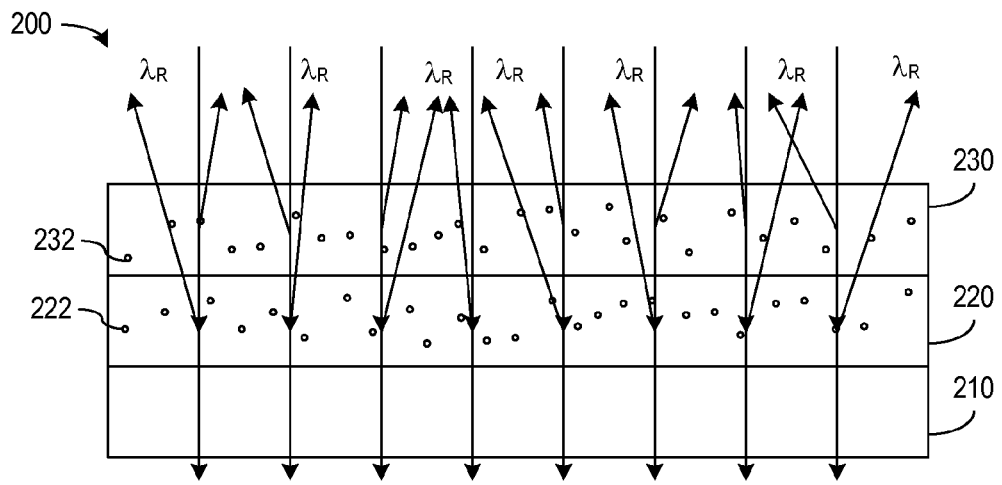
FIG. 2 shows a cross-sectional view of a diffuse mirror using cholesteric layers of opposite handedness.

Diffuse reflector 100 of FIG. 1 has reflectivity that is limited because a cholesteric material may only reflect one handedness of circularly polarized light. However, a two layer diffuse reflector 200 as shown in FIG. 2 can increase reflectivity by employing a substrate 210 that is coated with a left-handed layer 220 and a right-handed layer 230. If both layers are tailored to reflect light in the same band centered on wavelength $\lambda_R$, the reflectivity of diffuse reflector 200 for unpolarized incident light can be about twice the reflectivity of diffuse reflector 100 for unpolarized incident light. Each layer 220 or 230 can contain discrete particles 222 or 232 as described above, so that both layers 220 and 230 produce diffuse reflection.

Figure 3:
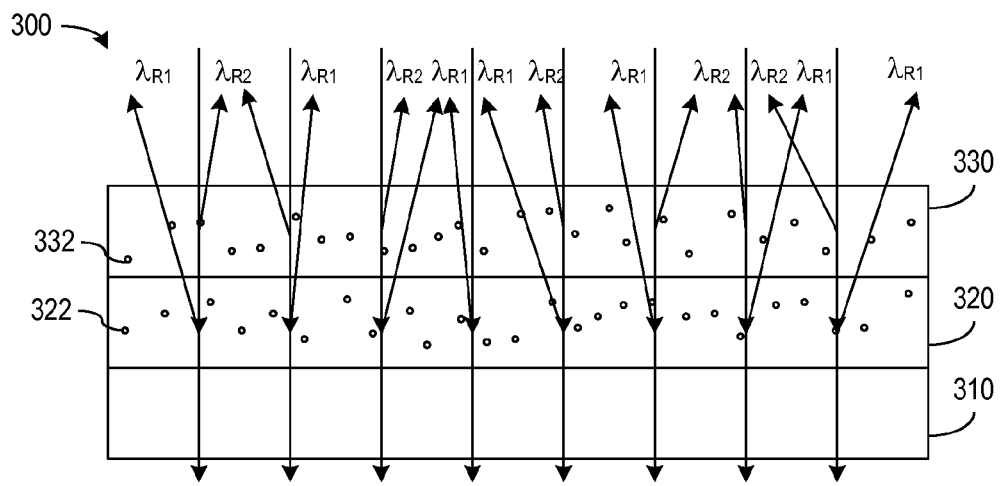
FIG. 3 shows a cross-sectional view of a diffuse mirror using multiple cholesteric layers that respectively reflect different wavelengths of light.

A multilayer diffuse reflector can also be created to diffusely reflect multiple wavelengths of light. FIG. 3, for example, shows a cross-section of a diffuse reflector 300 including a substrate 310 have a first overlying layer 320 containing particles 322 and a second overlying layer 330 containing particles 332. Layer 320 can be formed using cholesteric reactive mesogens that provide a helical pitch that reflects a wavelength $\lambda_{R1}$, and layer 330 can be formed using cholesteric reactive mesogens that provide a helical pitch that reflects a wavelength $\lambda_{R2}$. Particles 322 and 332 in respective layers 320 and 330 cause defects or disclinations creating separate cholesteric domains, which provide diffuse reflection as described above. Diffuse reflector 300 can thus reflect two different colors of light. More generally, a diffuse reflector containing multiple layers of cholesteric reactive mesogens containing particles that disrupt the alignment of the cholesteric reactive mesogens can diffusely reflect multiple wavelengths of light.

Figure 4:
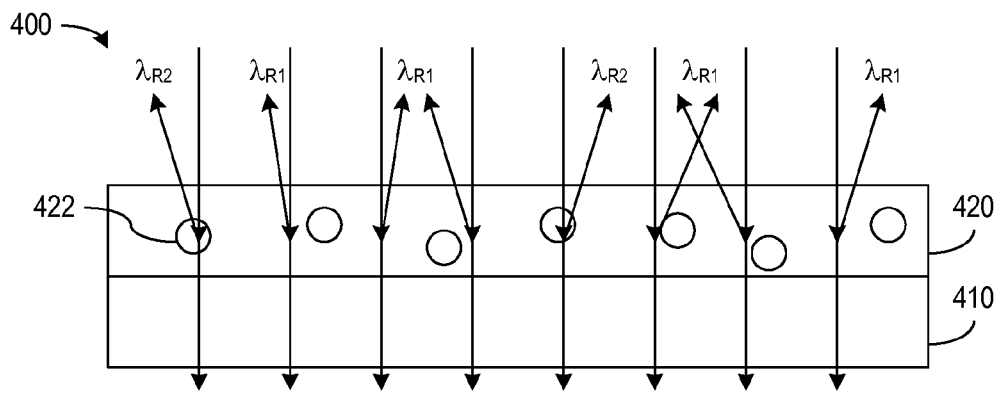
FIG. 4 shows a cross-sectional view of a diffuse mirror using cholesteric host layer containing particles that have a direct optical effect.

Reflectors 100, 200, and 300 of FIGS. 1, 2, and 3 as described above can employ particles that do not have a significant direct effect on light having the wavelengths of interest. For example, particles 122, 222, 232, 322, and 332 may have diameters or dimensions that are smaller than the shortest wavelength of visible light, e.g., nanoparticles with diameters less than about 300 nm for visible light, so that the random placement of the particles in their respective layers does not have a significant effect on visible light. However, in some configurations, the particles that create disclinations causing diffuse reflections may also have a direct optical effect on incident light. FIG. 4 shows an example of a diffuse reflector 400 that including a substrate 410 coated with a layer 420 of cholesteric reactive mesogens having a helical structure that selectively reflects light in a band centered on a wavelength $\lambda_{R1}$. Layer 420 also contains particles 422 that disrupt the structure of layer 420, causing the reflection of light of wavelength $\lambda_{R1}$ to be diffuse.

Particles 422 are large enough and have characteristics that provide direct optical effects on incident light. In one variant of diffuse reflector 400, particles 422 are made of cholesteric reactive mesogens of a different type from the remainder of layer 410. If the particles are large compared with wavelength of light, particles 422 will themselves reflect light. For example, particles 422 may be flakes of a material having a helical structure that reflects a wavelength $\lambda_{R2}$ when the host material of layer 420 reflects a wavelength $\lambda_{R1}$ of light. In this variant, the host material of layer 420 and particles/flakes 422 reflect light, and the edges of the flakes nucleate the defects in the host polymer. These defects together with the random distribution in the orientation of the flakes give the film a diffuse characteristic for reflection of light in bands centered on wavelengths $\lambda_{R1}$ and $\lambda_{R2}$. The material of particles 422 could additionally or alternatively have the opposite chiral handedness to the host film 420 so that the resulting single-layer structure reflects both polarizations of light. Accordingly, particles 422 could be tuned to reflect either the same color as host layer 420, i.e., $\lambda_{R1}=\lambda_{R2}$, or a different color from host layer 420, i.e., $\lambda_{R1}\neq\lambda_{R2}$. It may be noted that a layer such as layer 420 containing particles 422 that have a direct optical affect could be employed in a multilayer diffuse reflector such as described with reference to FIGS. 2 and 3.

Figure 5A:
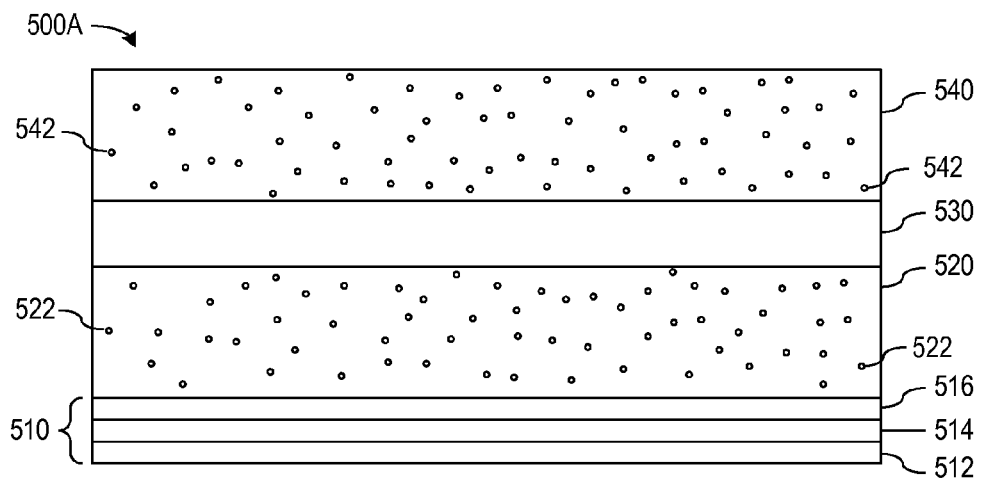
FIGS. 5A, 5B, and 5C show examples of diffuse mirrors including two cholesteric layers and an intervening half wave plate.

Layers of cholesteric reactive mesogens with embedded particles can be used with other types of optical layers to achieve diffuse reflection or other optical effects. FIG. 5A shows an example of a diffuse reflector 500A including a substrate 510 on which a first layer 520 of cholesteric reactive mesogens, an optical layer 530, and a second layer 540 of cholesteric reactive mesogens are formed. In the illustrated example, substrate 510 includes a glass substrate 512, a rubbed polyimide layer 514, and an alignment layer 516. Glass substrate 512 provides a transparent support. Alignment layer 516 can contain reactive mesogens that work with rubbed polyimide layer 514 to improve the alignment of cholesteric reactive mesogens within cholesteric domains in layer 520 in the manner described above.

Layer 520 can be a polymerized layer of cholesteric reactive mesogens such as RMS 03-009, which is commercially available from Merck KGaA, containing discrete particles 522 that nucleate defects or disclinations separating cholesteric domains in layer 520. As described above, such cholesteric domains can collectively cause diffuse reflection of light have a wavelength corresponding to the helical pitch of layer 520 and a circular polarization corresponding to the handedness of the cholesteric reactive mesogens in layer 520.

Optical layer 530 has a thickness or other characteristic that changes light transmitted through optical layer 530 and may further have surfaces that homeotropically or homogeneously align the cholesteric reactive mesogens at the interfaces with layers 520 and 540. In one example, layer 530 forms a half-wave plate and has a thickness of birefringent material selected to convert circularly polarized light of the reflected wavelength from one handedness to the other handedness. A half-wave plate 530 can be provided in diffuse mirror 500A by attaching a prefabricated sheet of a birefringent material of the proper thickness to layers 520 and 540 or by depositing a layer of reactive mesogens of a controlled thickness that cause layer 530 to act as a half-wave plate for the desired wavelength of light. Optical layer 530 could have other optical effects such as photoluminesences or acting as a retardation plate other than a half-wave plate.

Layer 540 may be another polymerized layer of the same cholesteric reactive mesogens used in layer 520. In the example of FIG. 5A, layer 540 contains discrete particles 542 that nucleate defects or disclinations separating cholesteric domains in layer 540. As described above, such cholesteric domains can collectively cause diffuse reflection of light having a wavelength corresponding to the helical pitch of the cholesteric reactive mesogens in layer 540 and a circular polarization corresponding to the handedness of the cholesteric reactive mesogens.

In operation, light incident on layer 540 and having a wavelength in the reflective band of layer 540 and a circular polarization corresponding to the handedness of the cholesteric reactive mesogens in layer 540 is diffusely reflected by layer 540. Layer 540 also transmits light that has either a wavelength that is not in the reflective band or that has a circular polarization opposite the handedness of the cholesteric reactive mesogens in layer 540. Transmitted light having wavelengths in the reflective band of layer 540 primarily will be circularly polarized with a handedness opposite to that of the cholesteric reactive mesogens in layer 540. When layer 530 is a half-wave plate, layer 530 may convert the light transmitted through layer 540 into the circularly polarized light of the handedness that is diffusely reflected by layer 520. Accordingly, diffuse reflector 500A can diffusely reflect both circular polarizations of light in the reflective band when layers 520 and 540 contain the same cholesteric reactive mesogens. Wavelengths that are not in the reflective band are transmitted through layers 540, 530, and 520, and substrate 510.

Figure 5B:
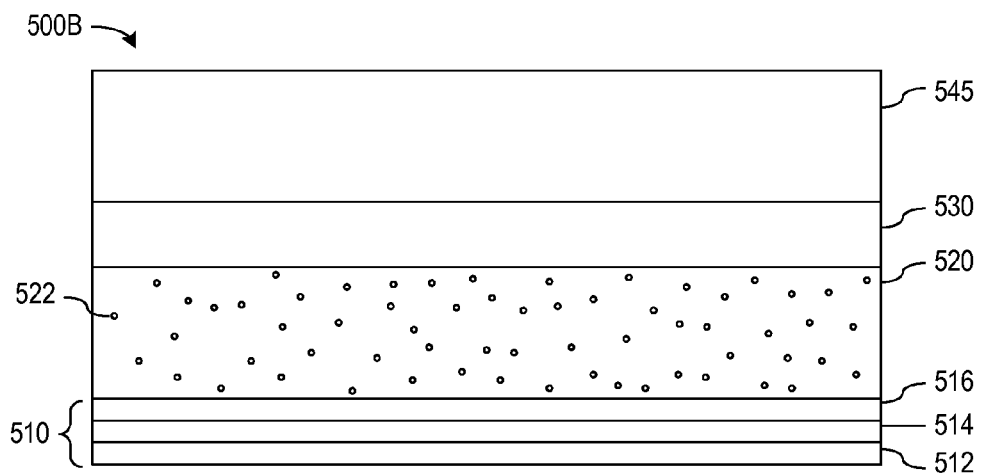

FIG. 5B shows an example of a diffuse reflector 500B that has the same structure as reflector 500A of FIG. 5A, except that layer 540 of reflector 500A is replaced with a layer 545 in reflector 500B. Layer 545 may be a polymerized layer of cholesteric reactive mesogens without particles that nucleate disclinations. In one configuration of diffuse mirror 500B, layer 520 contains particles 522 that nucleate defects or disclinations and create cholesteric domains that diffusely reflect one circular polarization of light as described above. Although layer 545 does not include particles, the disclinations in layer 520 may have alignment effects on overlying layers 530 and 545, so that layer 545 is also able to cause some level of diffuse reflection. In general, diffuse mirror 500B may be able to provide reflection and transmission characteristics that differ from those of diffuse mirror 500A.

Figure 5C:
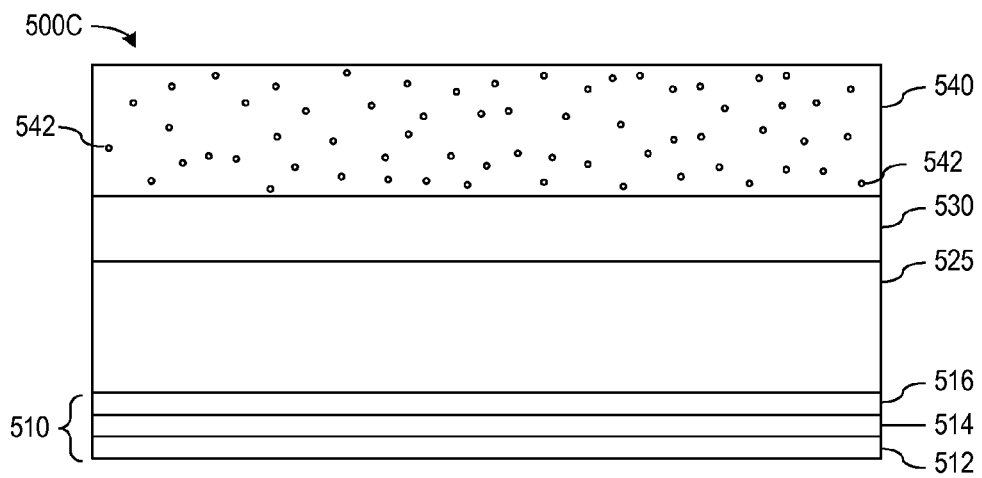

FIG. 5C shows another example of a diffuse reflector 500C that has the same structure as reflector 500A of FIG. 5A, except that layer 520 of reflector 500A is replaced with a layer 525 in reflector 500C. Layer 525 may be a polymerized layer of cholesteric reactive mesogens without particles that nucleate disclinations. Diffuse mirror 500C can thus provide diffuse reflection with different characteristics from diffuse mirror 500A or 500B.

Figure 6:
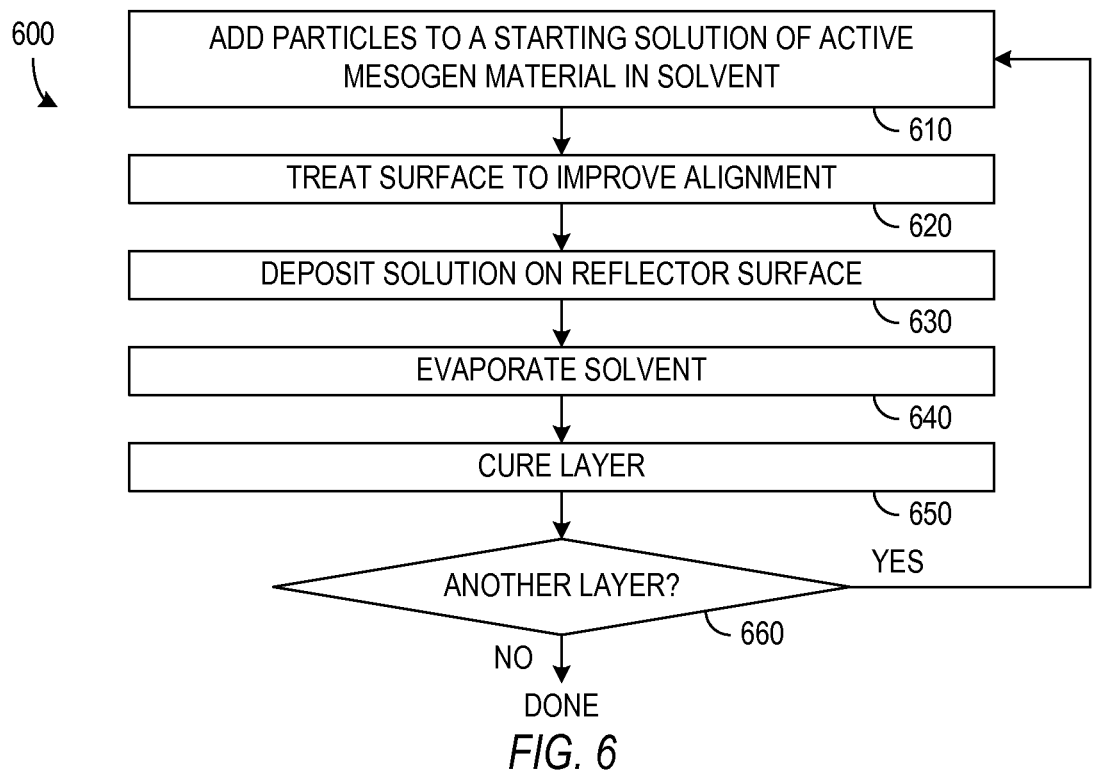
FIG. 6 is a flow diagram for an example of a process for fabricating a diffuse mirror including a layer of cholesteric polymer containing discrete particles that disrupt order in the polymer.

FIG. 6 is a flow diagram of a process 600 for fabrication of a diffuse reflector containing one or more polymer layers made using cholesteric reactive mesogens. In block 610, particles are added to a starting solution of the cholesteric reactive mesogen material. The cholesteric reactive mesogen material may, for example, be nematic liquid crystal solution with a chiral additive of a desired handedness added to provide the liquid crystal with a desired helical pitch that will reflect a desired wavelength. In one specific arrangement, the reactive mesogen is RMS 03-009 from Merck KGaA. Some other examples of suitable reactive mesogen materials include: RMS 03-008, RMS 03-010 and RMS 03-001c available from Merck KGaA; Paliocolor LC242 and Paliocolor LC 756 available from BASF; and ST 03952, ST 03457, and ST 04064 available from Synthon Chemicals. Some of these reactive mesogens are cholesteric, but others are nematic but can be converted to cholesteric materials through addition of a suitable chiral additive.

Many different types of particles could be added as noted above. The added particles may, for example, be optically inert particles having a diameter less than a few hundred nanometers, e.g., about 230 nm, made of material that relatively inert chemically, e.g., mica, silica encapsulated titanium dioxide ($TiO_2$), or other silicates. Examples of optically inert particles include R105 titanium dioxide particles from DuPont or Aerosil R812 silica particles from Evonik Industries. Alternatively, the added particles may be particles such as Xirallyc T60-10 SW crystal silver or Colorstream T10-01 Viola fantasy from Merck KGaA or Firemist Velvet Pearl EH921 from BASF that have a direct optical effect. The particles may also be flakes made up from a cholesteric polymer as described above. The particles can be further treated with an organic material. In particular, the surfaces of the particles may be treated to prevent the particles from aggregating together and to ensure dispersion of the particles in the polymer.

Block 620 is an optional treatment of the surface on which the current layer is being formed. The treated surface may be the surface of the substrate or a surface of a layer previously formed overlying the substrate. For example, the top surface of the substrate or a multi-layer structure could be rubbed or buffed. Alternatively, treatment could be more complex and involve the deposition of a material such as a polyimide, PVA, PMMA, Teflon, evaporated silicon monoxide, or a microstructure surface, rubbing the deposited material, and then possible coating of the surface with a layer of a non-chiral reactive mesogens.

Block 630 is the deposition of the solution of cholesteric reactive mesogens with particles on the surface that may have been treated. A variety of materials can be used for the substrate on which the initial layer is deposited. Some examples include glass and rigid or flexible plastic. The substrate may be transparent for some applications and may be opaque for some other applications. For example, an opaque substrate could be paper. The solution can be deposited by, for example, spin coating, blade coating, bar coating, or printing. In general, such deposition processes can be performed at atmospheric pressure, so that a vacuum chamber or wafer processing equipment is not required. Precise control of the thickness of the layer may not be required. For each cholesteric layer, the thickness may be about 8 or more times the helical pitch of the cholesteric layer, which is a thickness of cholesteric materials that some studies have shown to provide near total reflection of a single handedness of circular polarization of light. The deposition process may further be simplified when the surfaces is relatively flat but could alternatively be applied to a textured or curved surface. However, the underlying surface does not need to be rough or perfectly smooth to obtain a diffuse reflector. The coating process, being relatively simple, lends itself to scaling for large size diffuse reflectors that might be used in a display device such as computer monitor or a television.

Block 640 evaporates the solvent from the solution. The evaporation process can be performed at low temperature, e.g., about 60 to 80° C. for about 10 seconds to 1 minute on a heating stage. The temperature and time used for evaporation process 640 may depend on the solvent used. Block 650 may then cure the deposited material to form a polymer film. For example, exposure to ultraviolet light may cure the material into a polymer film. Such a curing process can be carried out in air at atmospheric pressure for some reactive materials or in a more inert gas such as nitrogen for other reactive materials. During solvent evaporation and curing, the particles are in the film being formed and disrupt the otherwise near-perfect alignment of the reactive mesogen from the solution. In particular, the particles nucleate defects and disclinations that propagate through the film. As described above, these defects and the associated cholesteric regions scatter the light at different angles and give the film a diffuse character. Accordingly, the diffuse properties are due to the defect structures in the film, not the particles themselves.

The polymer nature of the film thus created makes the film durable and provides a surface upon which further layers may be formed. Block 660 determines whether further layer are need to complete the desired diffuse reflector. If so, process 600 can branch back to block 610 and prepare a solution for the next layer in the reflector. If not, the reflector is complete.

Process 600 enables the fabrication of a diffuse reflector using a small number of simple processes performed under atmospheric conditions. The process is readily scalable to large area reflectors and can provide rigid or flexible reflectors having a wide range of surface textures. Reflectors produced by process 600 can be used in color reflective displays. Process 600 also provides a wide design space for selections of host materials and particles in layers to provide distinctive optical effects. Accordingly, diffuse reflectors could be used on a variety of products simply to provide a decorative or distinctive visual appearance. The wide design space further permits use of diffuse reflectors for anti-counterfeiting applications. In particular, the color, light scattering, and polarization properties of reflected or transmitted light could be used to give a unique signature that is difficult to replicate without precise reproduction of the diffuse reflector. The defect structure of a diffuse reflector provides a visible texture that is visible under a microscope and could also be used to identify an anti-counterfeiting signature.

Although particular implementations have been disclosed, these implementations are only examples and should not be taken as limitations. Various adaptations and combinations of features of the implementations disclosed are within the scope of the following claims.

What is claimed is:

1. A diffuse reflector comprising:
   a first layer of cholesteric material that reflects a first wavelength of light; and
   non-cholesteric material particles in the first layer at a concentration such that the particles create a plurality of cholesteric domains in the first layer that reflect light having the first wavelength in different directions,
   wherein the particles are treated with an organic material so as to decrease aggregation of the particles, to promote dispersion of the particles within the cholesteric material, and to disrupt a self-ordering nature of the cholesteric material to increase a number and an orientation randomness of the cholesteric domains, thereby increasing optical diffusion of the cholesteric material.

2. The diffuse reflector of claim 1, further comprising:
   a second layer of cholesteric material that overlies the first layer and reflects the first wavelength of light; and
   particles in the second layer at a concentration such that the particles in the second layer create a plurality of cholesteric domains in the second layer that reflect light of the first wavelength or of a second wavelength.

3. The diffuse reflector of claim 2, wherein the cholesteric material in the second layer has a handedness that is opposite to a handedness of the cholesteric material in the first layer.

4. The diffuse reflector of claim 2, further comprising a half-wave plate between the first layer and the second layer.

5. The diffuse reflector of claim 1, further comprising a second layer of a birefringent polymer material that is formed overlying the first layer.

6. The diffuse reflector of claim 1, wherein the particles have a size smaller than the first wavelength.

7. The diffuse reflector of claim 1, wherein the particles reflect the first wavelength of light.

8. The diffuse reflector of claim 1, wherein the particles reflect a second wavelength of light.

9. The diffuse reflector of claim 1, further comprising:
   a textured substrate on which the first layer is formed,
   wherein the cholesteric domains inhibit smoothing of distortions created by a texture of the textured substrate resulting from self-ordering of the cholesteric material on the textured substrate.

10. A process for fabricating a diffuse reflector, comprising:
    combining non-cholesteric material particles in a solution containing a cholesteric material;
    depositing the solution on a surface; and
    processing the solution to form a film through a process during which the particles disrupt alignment of mesogens in the solution and nucleate defects that propagate through the film formed from the solution such that the film reflects light in a first wavelength in different directions,
    wherein the particles are treated with an organic material so as to decrease aggregation of the particles, to promote dispersion of the particles within the cholesteric material, and to disrupt a self-ordering nature of the cholesteric material to increase a number and an orientation randomness of the cholesteric domains, thereby increasing optical diffusion of the cholesteric material.

11. The process of claim 10, further comprising treating the surface before depositing the solution to provide a base alignment of the cholesteric material.

12. The process of claim 10, further comprising using one or more solution coating process to form one or more polymer layers on the film.

13. The process of claim 10, wherein the cholesteric material forms a helical structure that reflects the first wavelength of light.

14. The process of claim 13, wherein the particles have a size smaller than the first wavelength.

15. The process of claim 13, wherein the particles reflect a second wavelength of light.

16. The process of claim 10, further comprising:
    applying the film on a textured substrate,
    wherein the defects that propagate through the film inhibit smoothing of distortions created by a texture of the textured substrate resulting from self-ordering of the cholesteric material on the textured substrate.

\* \* \* \* \*